United States Patent
Boiragi et al.

(10) Patent No.: US 12,270,521 B2
(45) Date of Patent: Apr. 8, 2025

(54) LANDING MARKER AREA LIGHT SYSTEM AND AERIAL VEHICLE INCLUDING THE SAME

(71) Applicant: HONEYWELL INTERNATIONAL INC., Charlotte, NC (US)

(72) Inventors: Indrajit Boiragi, Bangalore (IN); Deepak Bhimrao Mahajan, Bangalore (IN); Senthilkumar Sivaprakasam, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 122 days.

(21) Appl. No.: 18/149,235

(22) Filed: Jan. 3, 2023

(65) Prior Publication Data

US 2024/0167658 A1    May 23, 2024

(30) Foreign Application Priority Data

Nov. 17, 2022    (IN) .............................. 202211065929

(51) Int. Cl.
| | |
|---|---|
| *F21S 41/63* | (2018.01) |
| *B64D 47/04* | (2006.01) |
| *F21V 23/04* | (2006.01) |
| *G01C 5/00* | (2006.01) |
| *G02B 3/14* | (2006.01) |
| *G02F 1/29* | (2006.01) |

(52) U.S. Cl.
CPC .............. *F21S 41/63* (2018.01); *B64D 47/04* (2013.01); *F21V 23/0442* (2013.01); *G01C 5/005* (2013.01); *G02F 1/29* (2013.01); *G02B 3/14* (2013.01)

(58) Field of Classification Search
None
See application file for complete search history.

(56) References Cited

U.S. PATENT DOCUMENTS

| | | |
|---|---|---|
| 11,192,494 B2 | 12/2021 | Giffen et al. |
| 11,293,611 B2 | 4/2022 | Jha et al. |
| 2012/0130566 A1 | 5/2012 | Anderson |
| 2016/0280393 A1 | 9/2016 | Mouton et al. |

FOREIGN PATENT DOCUMENTS

| | | | |
|---|---|---|---|
| CN | 111562791 A | | 8/2020 |
| EP | 3002221 A1 | | 4/2016 |
| EP | 3733526 A1 | | 11/2020 |
| WO | 2018091649 | * | 5/2018 |
| WO | 2020144218 | * | 7/2020 |

* cited by examiner

*Primary Examiner* — Ashok Patel
(74) *Attorney, Agent, or Firm* — Lorenz & Kopf LLP (57) ABSTRACT

A landing marker area light system includes a housing, a first light source, a plurality of second light sources, an optics assembly, a tunable lens, and a controller. The first light source emits a first light beam. The second light sources surround the first light source and each emits a second light beam. The optics assembly receives the first light beam and shapes the first light beam into a first geometric-shaped light beam having a first perimeter. The tunable lens receives the first geometric-shaped light beam and, in response to lens control signals, shapes the first geometric-shaped light beam into a second geometric-shaped light beam having a second perimeter that is different than the first perimeter. The controller supplies the lens control signals to the tunable lens, to thereby control the second perimeter of the second geometric-shaped light beam.

16 Claims, 5 Drawing Sheets

LANDING MARKER AREA LIGHT SYSTEM AND AERIAL VEHICLE INCLUDING THE SAME

CROSS-REFERENCE TO RELATED APPLICATION

This application claims priority to India Provisional Patent Application No. 202211065929, filed Nov. 17, 2022, the entire content of which is incorporated by reference herein.

TECHNICAL FIELD

The present invention generally relates to landing lights, and more particularly relates to a landing marker area light system for aerial vehicles and more particularly for vertical take-off and landing (VTOL) vehicles.

BACKGROUND

Traffic congestion in densely populated areas has prodded research into alternate transportation platforms. One such alternative transportation platform is referred to as urban air mobility. Urban air mobility (UAM) refers to the use of relatively small, relatively lightweight aircraft (either manned or unmanned), such as Vertical Takeoff and Landing (VTOL) vehicles, and particularly electric or electric hybrid VTOLs (eVTOLs), to transport passengers between destinations in the same urban area. It is envisioned that such aircraft, which are sometimes referred to as "air taxis," may use high rise rooftops or other relatively tall structures (e.g., parking garages) as landing/takeoff locations and where passengers would embark to and disembark from the aircraft.

Regardless of the specific take-off and landing locations, it is envisioned that each of these sites will have one or more designated landing area markers on the landing surface. These markers, which may include ArUco markers, will provide visual aids to support alignment and landing by either a pilot or an autopilot, and to enhance the safety of the ground crew. Such landing markers may be readily visible during daylight hours and under high visibility conditions, but the markers may need to be illuminated during nighttime hours or any other low visibility conditions. To facilitate this, the vehicles will need to be equipped with a lighting system that, when needed, will illuminate the markers. Unfortunately, currently envisioned lighting systems do not sufficiently support accurate vehicle approach and landing operations (both manual and automatic), are not cost-effective, are relatively heavy, and could potentially increase maintenance costs.

Hence, there is a need for a lighting system for UAM vehicles that, when needed, will illuminate landing markers, while supporting accurate vehicle approach and landing operations (both manual and automatic), and that are cost-effective, relatively lightweight, and relatively low maintenance. The present disclosure addresses at least one or more of these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a landing marker area light system includes a housing, a first light source, a plurality of second light sources, an optics assembly, a tunable lens, and a controller. The housing is adapted to be coupled to a fuselage of a vertical take-off and landing (VTOL) vehicle. The first light source is coupled to the housing and is configured to emit a first light beam. The second light sources are coupled to the housing and surround the first light source. Each of the second light sources is configured to emit a second light beam. The optics assembly is coupled to the housing and is disposed adjacent to the first light source. The optics assembly is positioned to receive the first light beam and is configured to shape the first light beam into a first geometric-shaped light beam having a first perimeter. The tunable lens is disposed adjacent to the optics assembly. The tunable lens is positioned to receive the first geometric-shaped light beam and is configured, in response to lens control signals, to shape the first geometric-shaped light beam into a second geometric-shaped light beam having a second perimeter that is different than the first perimeter. The controller is in operable communication with the tunable lens. The controller is configured to supply the lens control signals to the tunable lens, to thereby control the second perimeter of the second geometric-shaped light beam.

In another embodiment, a landing marker area light system includes a housing, a first light source, a plurality of second light sources, an optics assembly, a tunable lens, and a controller. The housing is adapted to be coupled to a fuselage of a vertical take-off and landing (VTOL) vehicle. The first light source is coupled to the housing and is configured to emit a first light beam. The second light sources are coupled to the housing and surround the first light source. Each of the second light sources is configured to emit a second light beam. The optics assembly is coupled to the housing and is disposed adjacent to the first light source. The optics assembly is positioned to receive the first light beam and is configured to shape the first light beam into a first ring-shaped light beam having a first outer diameter. The tunable lens is disposed adjacent to the optics assembly. The tunable lens is positioned to receive the first ring-shaped light beam and is configured, in response to lens control signals, to shape the first ring-shaped light beam into a second ring-shaped light beam having a second diameter that is different than the first diameter. The controller is in operable communication with the tunable lens. The controller is configured to supply the lens control signals to the tunable lens, to thereby control the second diameter of the second ring-shaped light beam.

In yet another embodiment, a vertical take-off and landing (VTOL) vehicle includes a fuselage and a landing marker area light system. The landing marker area light system includes a housing, a first light source, a plurality of second light sources, an optics assembly, a tunable lens, and a controller. The housing is coupled to the fuselage. The first light source is coupled to the housing and is configured to emit a first light beam. The second light sources are coupled to the housing and surround the first light source. Each of the second light sources is configured to emit a second light beam. The optics assembly is coupled to the housing and is disposed adjacent to the first light source. The optics assembly is positioned to receive the first light beam and is configured to shape the first light beam into a first ring-shaped light beam having a first outer diameter. The tunable lens is disposed adjacent to the optics assembly. The tunable lens is positioned to receive the first ring-shaped light beam and is configured, in response to lens control signals, to shape the first ring-shaped light beam into a second ring-shaped light beam having a second diameter that is different than the first diameter. The controller is in operable communication with the tunable lens. The controller is configured to supply the lens control signals to the tunable lens, to thereby control the second diameter of the second ring-shaped light beam.

Furthermore, other desirable features and characteristics of the landing marker area light system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
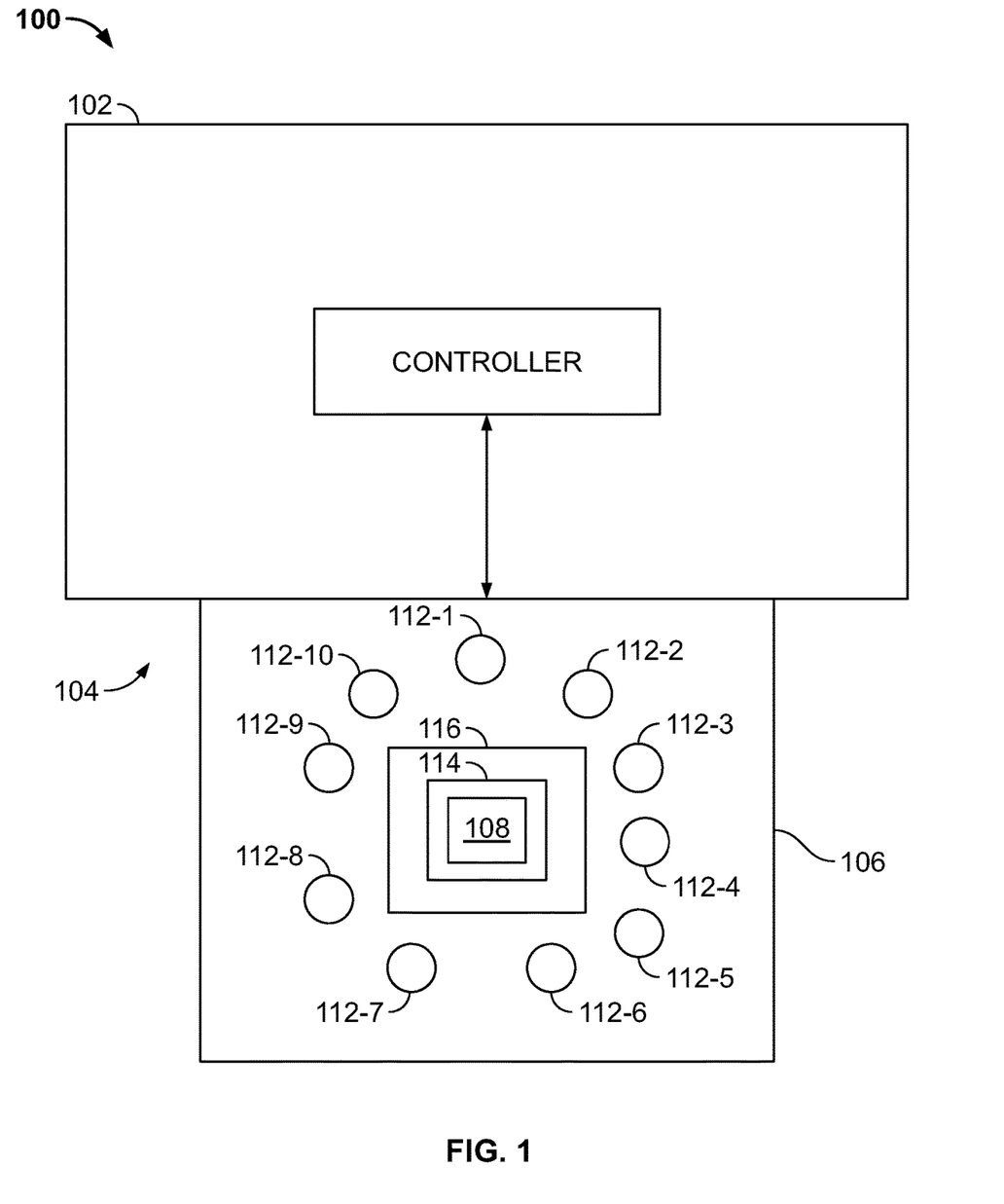
FIG. 1 depicts a functional block diagram of one embodiment of an aerial vehicle that includes a marker area light system.

Referring to FIG. 1, a functional block diagram of an aerial vehicle 100 is depicted. The aerial vehicle 100, which may be a vertical take-off and landing (VTOL) vehicle, includes at least a fuselage 102 and a landing marker area light system 104. It will be appreciated, however, that the aerial vehicle may be implemented as a non-VTOL vehicle. Moreover, before proceeding further, it is noted that, as used herein, the term VTOL encompasses all types of VTOLs, including non-electric, electric, and electric hybrid VTOLs.

Figure 2:
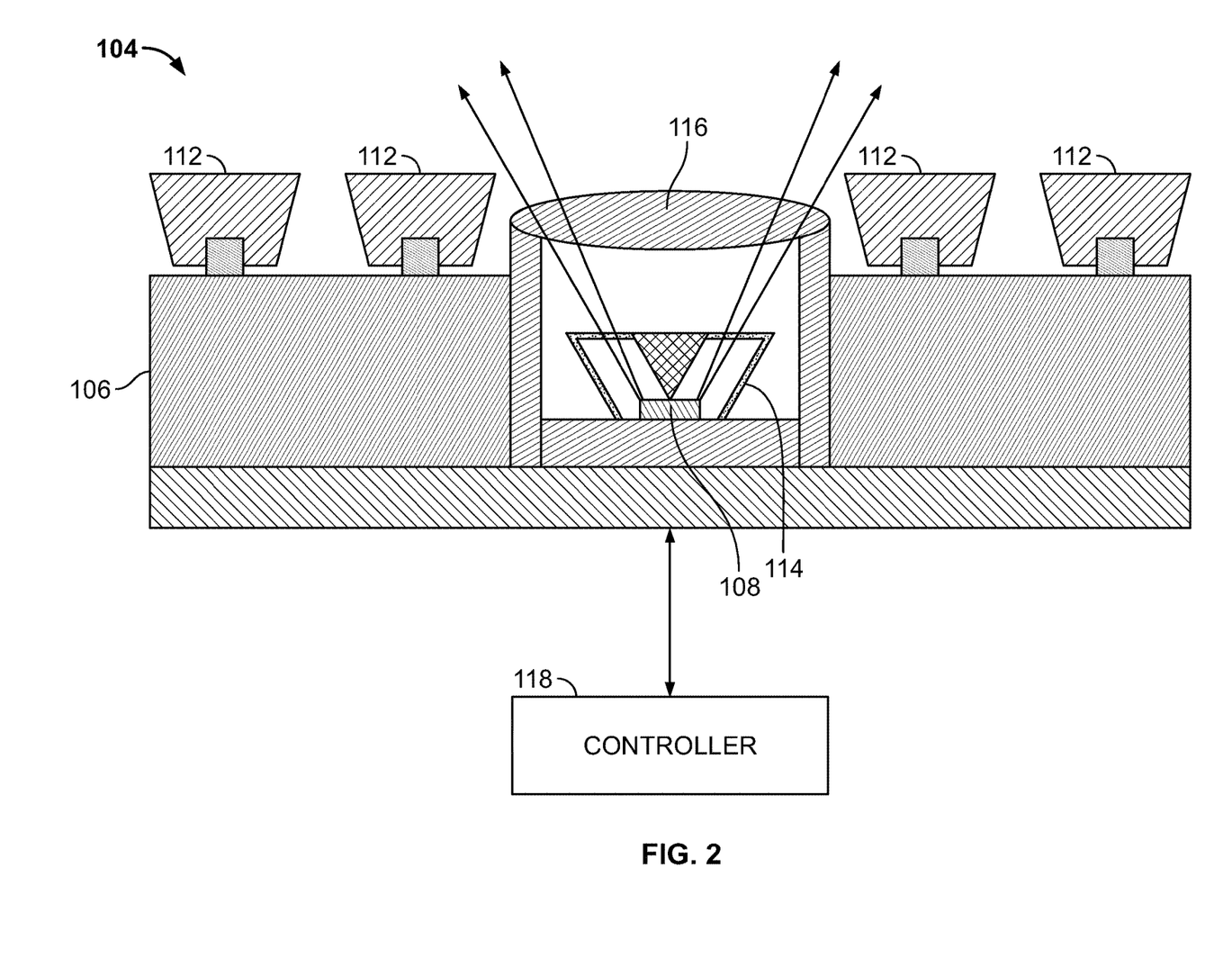
FIGS. 2 and 3 depict different views of one simplified representation of one embodiment of a marker area light system that may be included in the aerial vehicle of FIG. 1.
Figure 3:
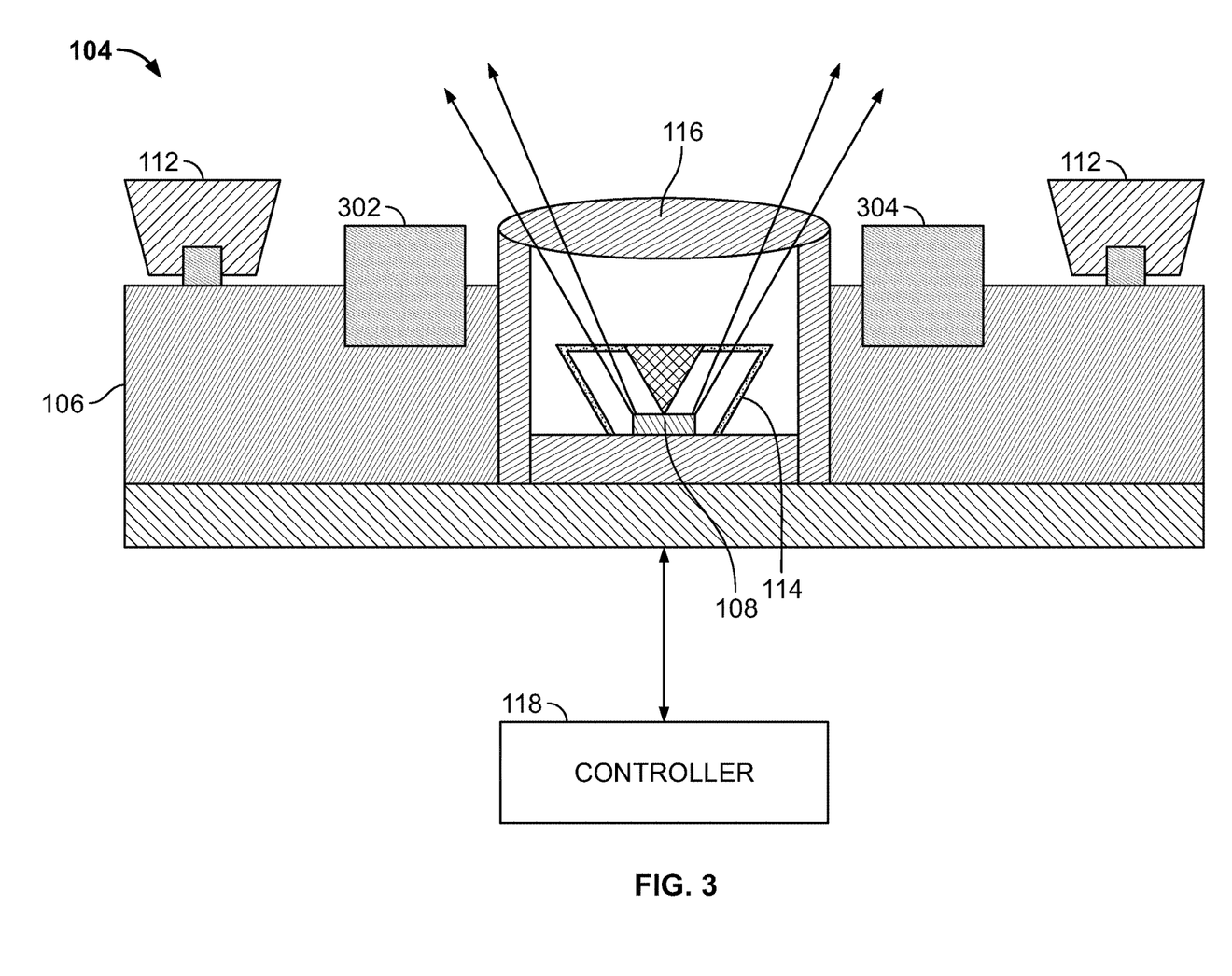

With the above in mind, it is seen that the depicted marker area light system 104 is at least partially mounted on and/or within the aerial vehicle 100 and includes a housing 106, which is coupled to the fuselage 102, and further includes a first light source 108, a plurality of second light sources 112, an optics assembly 114, a tunable lens 116, and a controller 118. The marker area light system 104 is configured to illuminate a landing area marker (not depicted in FIG. 1) in a manner that facilitates precision approach and landing of the aerial vehicle 100. A simplified representation of one particular embodiment of the marker area light system 104 is depicted in FIGS. 2 and 3, and with reference thereto will now be described.

The first light source 108 is coupled to the housing 106 and configured to emit a first light beam. Although the first light source 108 may be variously configured and implemented, in one embodiment the first light source 108 is implemented using one or more light emitting diode (LEDs) and is configured such that the first light beam is a non-white, color light beam. In some embodiments, the first light source 108 may be configured to controllably emit a plurality of different non-white, color beams. In still other embodiments, the first light source 108 may be configured to controllably emit a white light beam. The first light source 108 may be controlled to emit light in either a continuous mode or in a flash mode, as needed or desired.

The plurality of second light sources 112 are also coupled to the housing 106 and, as shown schematically in FIG. 1, surround the first light source 108. Although FIG. 1 depicts, merely for illustrative purposes, that there are 10 second light sources 112 (e.g., 112-1, 112-2, 112-3, . . . 112-10), it will be appreciated that there may be more or less than this number of second light sources 112. It will additionally be appreciated that although the second light sources 112 are depicted as being distributed around the first light source 108 in a circular pattern, these light sources 112 could be distributed in any one of numerous other geometric patterns. No matter the number and distribution pattern of the second light sources 112, each is configured to emit a second light beam, and are preferably configure such that each second light beam is a white light beam. Although the second light sources 112 may be variously implemented using any one of numerous types of light sources, in one embodiment each second light source 112 is implemented using an LED.

The optics assembly 114 is coupled to the housing and is disposed adjacent to the first light source 108. The optics assembly 114 is positioned to receive the first light beam emitted by the first light source 108 and is configured to shape the first light beam into a first geometric-shaped light beam having a first perimeter. The optics assembly 114 may be configured such that the geometric shape of the light beam is any one of numerous polygonal shapes or circular shapes (and thus the perimeter is more accurately described as the circumference). In one particular embodiment, which is discussed further below, the first geometric-shaped light beam is a ring-shaped light beam having an outer circumference and an inner circumference.

No matter the specific configuration of the optics assembly 114, the tunable lens 116 is disposed adjacent to the optics assembly 114 and is positioned to receive the first geometric-shaped light beam therefrom. The tunable lens 116 is coupled to receive lens control signals and is configured, in response to the lens control signals, to shape the first geometric-shaped light beam into a second geometric-shaped light beam having a second perimeter that is different than the first perimeter. The tunable lens 116 additionally helps focus the first geometric-shaped light beam. It will be appreciated that the geometric shape of the second geometric-shaped light beam is the same as the geometric shape of the first geometric-shaped light beam. However, as just noted, the perimeter (or circumference) is different, and preferably larger, than the first perimeter.

It will additionally be appreciated that the tunable lens 116 may be variously implemented. For example, the tunable lens 116 may be implemented using any one of numerous known electromechanical-type tunable lenses, in which a non-illustrated actuator physically moves the lens 116, in response to the lens control signals, to a desired position to thereby shape the first geometric-shaped light beam into the second geometric-shaped light beam. In other embodiments, the tunable lens 116 may be implemented using any one of numerous known electrically tunable lenses, where the lens 116 may comprise, for example, a shape-changing fluid that is responsive to the lens control signals.

The controller 118 is in operable communication, via either a wired or wireless connection, with the tunable lens 116. The controller 118 is configured to supply the lens control signals to the tunable lens 116, to thereby control the second perimeter of the second geometric-shaped light beam. More specifically, the controller 118, at least in one embodiment, supplies the lens control signals based on the altitude of the aerial vehicle 100. As such, as the altitude of the aerial vehicle 100 decreases toward the landing area, the second perimeter of the second-geometric shaped light beam, on the landing area, is maintained at a constant value.

To assist in implementing the above functionality, the controller 118 preferably receives altitude data. Although the source of this altitude data may vary, in the depicted embodiment, as shown in FIG. 3, the marker area light system 104 may additionally include an altitude sensor 302. The depicted altitude sensor 302 is coupled to the housing 106 and is thus configured to sense an altitude of at least the housing 106 and to supply altitude data indicative of the sensed altitude to the controller 118. Because the housing 106 is coupled to the fuselage 102 of the aerial vehicle 100, the altitude data is also indicative of the altitude of the aerial vehicle. The altitude sensor 302 may be implemented using any one of numerous types of suitable altitude sensors. In one particular embodiment, the altitude sensor 302 is implemented using a laser sensor.

In addition to controlling the second perimeter of the second geometric-shaped light beam, the controller 118, at least in some embodiments, is also configured to control the intensity of second light beams emitted from each of the second light sources 112 to ensure that, as the aerial vehicle approaches the landing area, the landing area marker remains visible. In these embodiments, the controller 118 is in operable communication, via either a wired or wireless connection, with each of the second light sources 112 and is configured to supply an intensity control signal to each of the second light sources 112. Each of the second light sources 112 will then emit the second light beam at an intensity based on the intensity control signal it receives. In some embodiments, the controller 118 supplies the intensity control signals in response to the altitude data supplied from the altitude sensor 302.

It will be appreciated that the controller 118 may be variously implemented to carry out its functionality. In one embodiment, controller 118 is implemented using a processing system that generally represents the hardware, circuitry, processing logic, and/or other components configured to facilitate communications and/or interaction between the elements of the landing marker area light system 104 and perform additional processes, tasks and/or functions to support operation of the system 104, as described in greater detail below. Depending on the embodiment, the controller 118 may be implemented or realized with a general-purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the controller 118 includes processing logic that may be configured to carry out the functions, techniques, and processing tasks associated with the operation of the landing marker area light system 104 described in greater detail herein. Furthermore, the steps of a method or algorithm described in connection with the embodiments disclosed herein may be embodied directly in hardware, in firmware, in a software module executed by the controller 118, or in any practical combination thereof. In accordance with one or more embodiments, the controller 118 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the controller 118, cause the controller 118 to execute and perform one or more of the processes, tasks, operations, and/or functions described herein.

Referring again to FIG. 3, in some embodiments the landing marker area light system 104 additionally includes a camera 304. The camera 304, when included, is coupled to the housing 106 and is configured to capture images of at least the second geometric-shaped light beam. The camera 304, when included, can be used to provide relay the captured images to a user to assist in landing the aerial vehicle 100. The camera 304 may also, in some embodiments, supply image data representative of the captured images to the controller 118. The controller 118 may then process the image data to assist in automatically landing the aerial vehicle 100.

Figure 4:
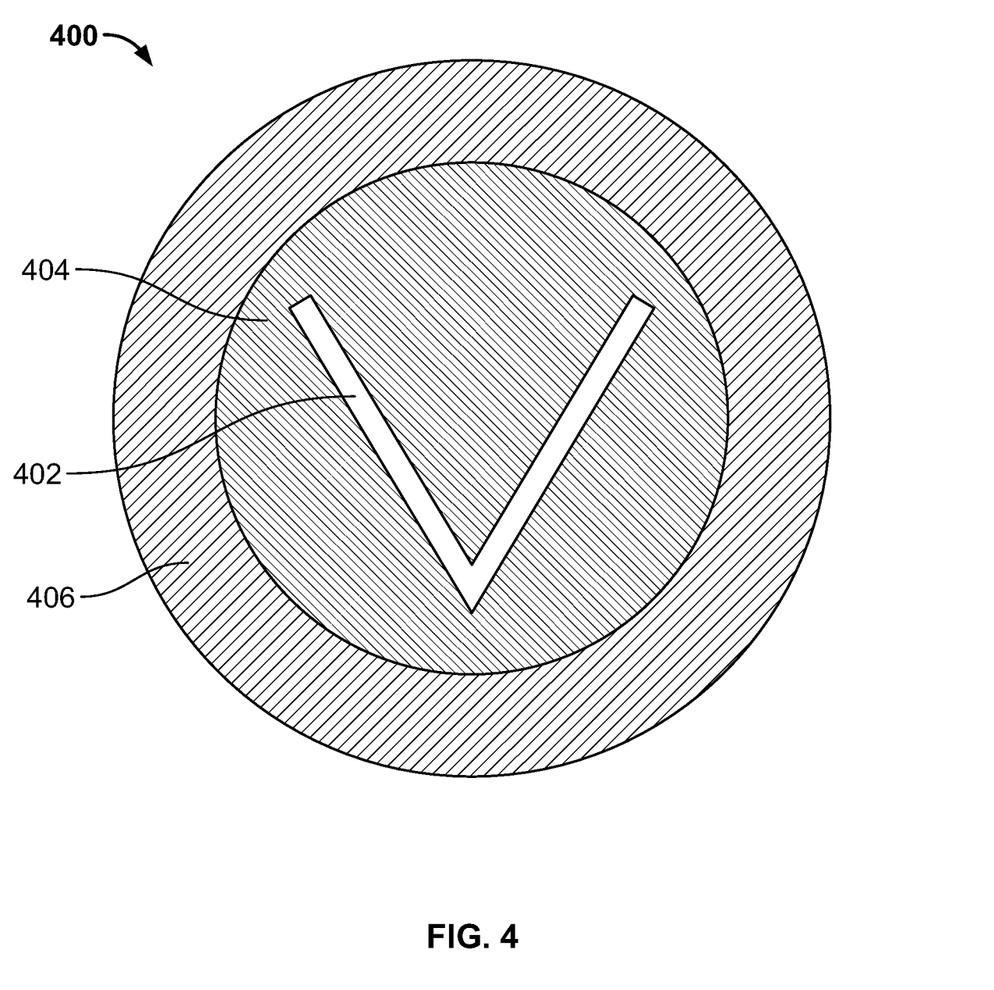
FIG. 4 depicts one embodiment of a landing area marker being illuminated by the marker area light system of FIGS. 2 and 3.
Figure 5:
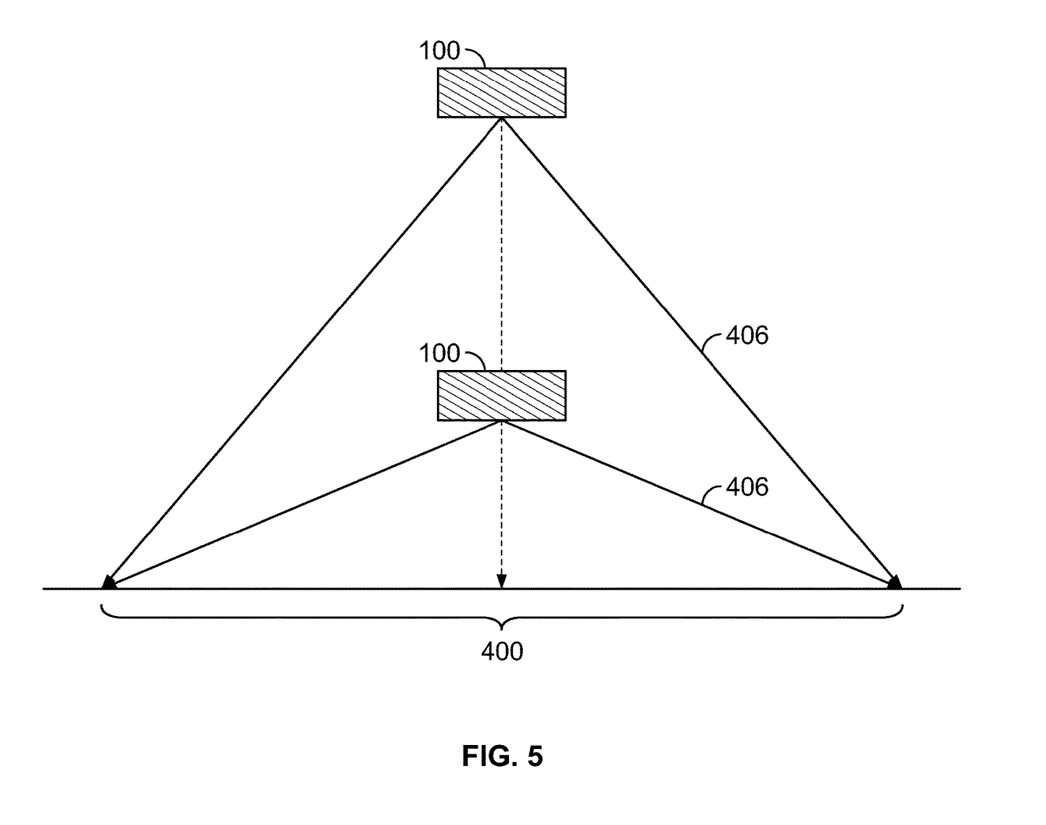
FIG. 5 depicts an operation of the marker area light system during a landing operation.

Referring now to FIGS. 4 and 5, the operation of the landing marker area light system 100 will be described in a bit more detail. Referring first to FIG. 4, one example of a landing area marker 400 is depicted. Although the depicted landing area marker 402 is circular and includes a V-shaped marker 402, it will be appreciated that the landing area marker 400 could take on different shapes and have different types of markers 402. For example, the landing area marker 400 could be shaped like any one of numerous polygons, and the marker 402 could be variously shaped, as any one of different alphanumeric shapes, or any one of numerous ArUco-type markers.

No matter the specific shape and marker type, and as FIG. 4 depicts, each of the second light beams emitted by the second light sources 112 converge to form a third geometric-shaped light beam 404 that illuminates the entirety of the landing area marker 400, and has a third perimeter (e.g., third circumference in the depicted example). In the embodiment depicted in FIG. 4, the second geometric-shaped light beam 406 is ring-shaped and thus the second perimeter is a second outer circumference. In any event, the second and third perimeters are at least substantially equal, and thus the second geometric-shaped light beam 406 overlaps an outer portion of the third geometric-shaped light beam 404.

Turning to FIG. 5, it is seen that, as described above, as the altitude of the aerial vehicle 100 decreases toward the landing area marker 400, the second perimeter of the second-geometric shaped light beam is maintained at a constant value. More specifically, at least in the depicted embodiment, the second outer diameter of the second-geometric shaped light beam, on the landing area marker 400, is maintained at a constant value. In particular, the diameter of the landing area marker 400. The controller 118 may be configured to implement this functionality until the aerial vehicle 100 has completely landed or until it has reached a predetermined altitude above the landing area marker 400. It will additionally be appreciated that in some embodiments, the controller 118 may be configured to command the first light source 108 to emit a light beam of different colors when the aerial vehicle 100 is at different altitudes.

The landing marker area light system described herein will illuminate landing markers, while supporting accurate vehicle approach and landing operations (both manual and automatic), and is cost-effective, relatively lightweight, and relatively low maintenance.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A landing marker area light system, comprising:
   a housing adapted to be coupled to a fuselage of a vertical take-off and landing (VTOL) vehicle;
   a first light source coupled to the housing and configured to emit a first light beam;
   a plurality of second light sources coupled to the housing and surrounding the first light source, each of the second light sources configured to emit a second light beam;
   an optics assembly coupled to the housing and disposed adjacent to the first light source, the optics assembly positioned to receive the first light beam and configured to shape the first light beam into a first geometric-shaped light beam having a first perimeter;
   a tunable lens disposed adjacent to the optics assembly, the tunable lens positioned to receive the first geometric-shaped light beam and configured, in response to lens control signals, to shape the first geometric-shaped light beam into a second geometric-shaped light beam having a second perimeter, the second perimeter being different than the first perimeter; and a controller in operable communication with the tunable lens, the controller configured to supply the lens control signals to the tunable lens, to thereby control the second perimeter of the second geometric-shaped light beam.

2. The system of claim 1, further comprising:
an altitude sensor configured to sense an altitude of at least the housing and supply altitude data indicative of the sensed altitude to the controller,
wherein the controller is responsive to the altitude data to supply the lens control signals.

3. The system of claim 2, wherein:
the controller is in operable communication with each of the second light sources and is further configured to supply an intensity control signal to each of the second light sources; and
each of the second light sources emits the second light beam at an intensity based on the intensity control signal supplied thereto.

4. The system of claim 3, wherein the controller is further responsive to the altitude data to supply the intensity control signals.

5. The system of claim 2, wherein the altitude sensor comprises a laser altitude sensor.

6. The system of claim 1, further comprising:
a camera coupled to the housing and configured to capture images of at least the second geometric-shaped light beam.

7. The system of claim 1, wherein:
the first light source is configured such that the first light beam is either a non-white, color light beam or a white light beam;
the first light source is controlled to emit the first light beam in either a continuous mode or in a flash mode; and
the second light sources are each configured such that each second light beam is a white light beam.

8. The system of claim 1, wherein the first light source comprises a light emitting diode (LED).

9. The system of claim 1, wherein the first geometric-shaped light beam is a ring-shaped light beam.

10. The system of claim 1, wherein:
each of the second light beams converge to form a third geometric-shaped light beam having a third perimeter; and
the third perimeter is substantially equal to, or greater than, or less than the second perimeter.

11. A landing marker area light system, comprising:
a housing adapted to be coupled to a fuselage of a vertical take-off and landing (VTOL) vehicle;
a first light source coupled to the housing and configured to emit a first light beam;
a plurality of second light sources coupled to the housing and surrounding the first light source, each of the second light sources configured to emit a second light beam;
an optics assembly coupled to the housing and disposed adjacent to the first light source, the optics assembly positioned to receive the first light beam and configured to shape the first light beam into a first ring-shaped light beam having a first outer diameter;
a tunable lens disposed adjacent to the optics assembly, the tunable lens positioned to receive the first ring-shaped light beam and configured, in response to lens control signals, to shape the first ring-shaped light beam into a second ring-shaped light beam having a second outer diameter, the second outer diameter being different than the first outer diameter; and
a controller in operable communication with the tunable lens, the controller configured to supply the lens control signals to the tunable lens, to thereby control the second outer diameter of the second ring-shaped light beam.

12. The system of claim 1, further comprising:
a laser altitude sensor configured to sense an altitude of at least the housing and supply altitude data indicative of the sensed altitude to the controller,
wherein the controller is responsive to the altitude data to supply the lens control signals.

13. The system of claim 12, wherein:
the controller is in operable communication with each of the second light sources and is further configured, in response to the altitude data, to supply an intensity control signal to each of the second light sources; and
each of the second light sources emits the second light beam at an intensity based on the intensity control signal supplied thereto.

14. The system of claim 11, further comprising:
a camera coupled to the housing and configured to capture images of at least the second ring-shaped light beam.

15. The system of claim 11, wherein:
the first light source is configured such that the first light beam is either a non-white, color light beam or a white light beam;
the first light source is controlled to emit the first light beam in either a continuous mode or in a flash mode; and
the second light sources are each configured such that each second light beam is a white light beam.

16. The system of claim 11, wherein:
each of the second light beams converge to form a circular light beam having a circular light beam diameter; and
the circular light beam diameter is substantially equal to, or greater than, or less than the second diameter.

* * * * *